United States Patent
Wimberley et al.

(10) Patent No.: US 12,261,957 B2
(45) Date of Patent: *Mar. 25, 2025

(54) SYSTEMS AND METHODS FOR ENHANCED MOBILE DEVICE AUTHENTICATION

(71) Applicant: JPMORGAN CHASE BANK, N.A., New York, NY (US)

(72) Inventors: Cedric Ken Wimberley, San Rafael, CA (US); Andrew Sloper, Surry (GB); Ta-Wei Chen, Princeton Junction, NJ (US); Gautam Chhawchharia, Mendham, NJ (US)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/497,549

(22) Filed: Oct. 30, 2023

(65) Prior Publication Data

US 2024/0080201 A1    Mar. 7, 2024

Related U.S. Application Data

(63) Continuation of application No. 16/994,205, filed on Aug. 14, 2020, now Pat. No. 11,838,421, which is a
(Continued)

(51) Int. Cl.
*H04L 9/32* (2006.01)
*H04L 9/06* (2006.01)
(Continued)

(52) U.S. Cl.
CPC .......... *H04L 9/3228* (2013.01); *H04L 9/0643* (2013.01); *H04L 9/0863* (2013.01);
(Continued)

(58) Field of Classification Search
None
See application file for complete search history.

(56) References Cited

U.S. PATENT DOCUMENTS

| | | | |
|---|---|---|---|
| 5,764,772 A * | 6/1998 | Kaufman | H04L 9/088 380/286 |
| 6,085,320 A | 7/2000 | Kaliski, Jr. | |

(Continued)

OTHER PUBLICATIONS

Liang et al "User Authentication Interfaces in Mobile Devices: Some Design Considerations," 2014 IEEE 17th International Conference on Computational Science and Engineering, IEEE Computer Society, pp. 754-757 (Year: 2014).*
(Continued)

*Primary Examiner* — Luu T Pham
*Assistant Examiner* — James J Wilcox
(74) *Attorney, Agent, or Firm* — GREENBERG TRAURIG LLP

(57) ABSTRACT

Systems and methods for enhanced mobile device authentication are disclosed. Systems and methods for enhanced mobile authentication are disclosed. In one embodiment, method for electronic device authentication may include (1) a server comprising at least one computer processor communicating a one-time passcode to an electronic device over a first communication channel; (2) the server receiving, from the electronic device over a second communication channel the one-time passcode encrypted with a private key associated with the electronic device; (3) the server decrypting the one-time passcode using a public key; (4) the server validating the one-time passcode; (5) the server generating a device identifier for the electronic device; and (6) the server persisting an association between the device identifier and the electronic device.

14 Claims, 5 Drawing Sheets

Related U.S. Application Data continuation of application No. 15/393,836, filed on Dec. 29, 2016, now Pat. No. 10,778,435.

(60) Provisional application No. 62/321,060, filed on Apr. 11, 2016, provisional application No. 62/273,003, filed on Dec. 30, 2015.

(51) Int. Cl.
*H04L 9/08* (2006.01)
*H04L 9/14* (2006.01)
*H04L 9/30* (2006.01)

(52) U.S. Cl.
CPC .................. *H04L 9/14* (2013.01); *H04L 9/30* (2013.01); *H04L 9/3231* (2013.01); *H04L 9/0825* (2013.01); *H04L 2209/56* (2013.01)

(56) References Cited

U.S. PATENT DOCUMENTS

| | | | |
|---|---|---|---|
| 6,212,585 B1 | 4/2001 | Chrabaszcz | |
| 6,434,238 B1 * | 8/2002 | Chaum | G07F 7/1008 380/45 |
| 6,880,079 B2 | 4/2005 | Kefford et al. | |
| 7,133,846 B1 | 11/2006 | Ginter et al. | |
| 7,165,174 B1 | 1/2007 | Ginter et al. | |
| 7,418,596 B1 | 8/2008 | Carroll et al. | |
| 7,500,616 B2 * | 3/2009 | Beenau | H04L 9/3273 235/382 |
| 7,870,599 B2 * | 1/2011 | Pemmaraju | H04L 63/18 713/168 |
| 8,180,051 B1 * | 5/2012 | O'Toole, Jr. | G06F 21/556 380/255 |
| 8,297,520 B1 * | 10/2012 | Wakerly | G06F 21/77 235/487 |
| 8,452,965 B1 | 5/2013 | Griffin et al. | |
| 8,458,483 B1 | 6/2013 | Bailey et al. | |
| 8,515,389 B2 | 8/2013 | Smetters et al. | |
| 8,533,460 B2 * | 9/2013 | Hird | G07F 7/1091 713/184 |
| 8,661,254 B1 * | 2/2014 | Sama | H04L 63/18 713/168 |
| 8,683,564 B2 * | 3/2014 | Khan | H04L 9/3236 713/168 |
| 8,719,952 B1 | 5/2014 | Damm-Goossens | |
| 8,751,793 B2 | 6/2014 | Ginter et al. | |
| 8,752,146 B1 * | 6/2014 | van Dijk | H04L 63/0861 713/184 |
| 8,769,289 B1 | 7/2014 | Kronrod | |
| 8,799,655 B1 * | 8/2014 | Dotan | H04W 12/068 713/168 |
| 8,832,788 B1 * | 9/2014 | Gibson | G06F 21/40 726/28 |
| 8,868,923 B1 * | 10/2014 | Hamlet | G06F 21/00 326/8 |
| 8,904,482 B1 | 12/2014 | Dotan et al. | |
| 9,032,171 B2 * | 5/2015 | Niles | G02B 15/04 707/646 |
| 9,032,212 B1 | 5/2015 | Juels | |
| 9,143,492 B2 * | 9/2015 | Redberg | H04W 12/04 |
| 9,154,304 B1 * | 10/2015 | Dotan | H04L 9/3228 |
| 9,178,880 B1 * | 11/2015 | Dotan | H04W 12/068 |
| 9,191,386 B1 | 11/2015 | Yaron et al. | |
| 9,197,414 B1 | 11/2015 | Martin et al. | |
| 9,202,035 B1 * | 12/2015 | Manusov | G06F 21/32 |
| 9,203,620 B1 * | 12/2015 | Nyström | H04L 9/3234 |
| 9,215,075 B1 | 12/2015 | Poltorak | |
| 9,231,925 B1 | 1/2016 | Lundström | |
| 9,292,668 B1 * | 3/2016 | Spangler | G06F 21/31 |
| 9,397,989 B1 | 7/2016 | Ramalingam et al. | |
| 9,432,339 B1 | 8/2016 | Bowness | |
| 9,461,759 B2 * | 10/2016 | Anniballi | H04H 60/44 |
| 9,537,654 B2 * | 1/2017 | Botero Montano | G06F 21/31 |
| 9,569,605 B1 * | 2/2017 | Schneider | H04L 9/3231 |
| 9,614,838 B1 * | 4/2017 | Duchin | H04L 9/3228 |
| 9,805,182 B1 * | 10/2017 | Kayyidavazhiyil | G06F 21/35 |
| 9,847,875 B1 * | 12/2017 | Berzin | H04L 9/0847 |
| 9,860,059 B1 | 1/2018 | Duane et al. | |
| 9,985,786 B1 * | 5/2018 | Bhabbur | G06F 3/0488 |
| 10,270,748 B2 | 4/2019 | Briceno et al. | |
| 10,516,527 B1 | 4/2019 | Briceno et al. | |
| 10,299,118 B1 * | 5/2019 | Karachiwala | H04L 67/55 |
| 10,356,087 B1 * | 7/2019 | Vetter | H04L 63/0838 |
| 10,373,158 B1 * | 8/2019 | James | G06Q 40/04 |
| 10,440,014 B1 * | 10/2019 | Hoyer | G06F 21/445 |
| 10,540,654 B1 * | 1/2020 | James | G06Q 20/223 |
| 10,778,435 B1 | 9/2020 | Wimberley et al. | |
| 10,915,891 B1 * | 2/2021 | Winklevoss | H04L 9/3255 |
| 10,929,842 B1 * | 2/2021 | Arvanaghi | H04L 9/3239 |
| 10,938,567 B2 * | 3/2021 | Martino | G06Q 20/065 |
| 11,139,955 B1 * | 10/2021 | So | G06Q 20/3674 |
| 11,184,356 B1 * | 11/2021 | Tandon | H04L 67/141 |
| 11,238,453 B2 | 2/2022 | Kim et al. | |
| 11,381,783 B1 * | 7/2022 | Ratnakaram | H04N 23/661 |
| 11,501,370 B1 * | 11/2022 | Paya | G06Q 20/3676 |
| 11,522,700 B1 * | 12/2022 | Auerbach | H04L 9/3213 |
| 11,651,357 B2 * | 5/2023 | Kumar | H04L 63/0838 705/73 |
| 11,838,421 B2 * | 12/2023 | Wimberley | H04L 9/30 |
| 11,909,860 B1 * | 2/2024 | So | G06Q 40/06 |
| 2002/0095507 A1 | 7/2002 | Jerdonek | |
| 2003/0074326 A1 * | 4/2003 | Byers | G06F 21/64 705/64 |
| 2003/0204726 A1 * | 10/2003 | Kefford | H04L 9/3271 713/171 |
| 2004/0093499 A1 | 5/2004 | Arditi et al. | |
| 2004/0098581 A1 | 5/2004 | Balfanz et al. | |
| 2004/0128519 A1 * | 7/2004 | Klinger | H04L 9/3231 713/186 |
| 2004/0238621 A1 * | 12/2004 | Beenau | G06Q 20/40 235/380 |
| 2005/0010786 A1 * | 1/2005 | Michener | G06Q 20/3823 705/64 |
| 2005/0123135 A1 * | 6/2005 | Hunt | H04N 21/4181 380/200 |
| 2006/0075506 A1 * | 4/2006 | Sanda | H04L 63/20 340/568.1 |
| 2006/0083228 A1 | 4/2006 | Ong et al. | |
| 2006/0085844 A1 * | 4/2006 | Buer | H04L 9/3263 726/4 |
| 2006/0136739 A1 * | 6/2006 | Brock | H04L 63/0838 713/184 |
| 2006/0156028 A1 * | 7/2006 | Aoyama | G07C 9/33 713/186 |
| 2006/0167784 A1 | 7/2006 | Hoffberg | |
| 2006/0242423 A1 * | 10/2006 | Kussmaul | H04L 9/3247 713/182 |
| 2006/0248082 A1 * | 11/2006 | Raikar | H04L 63/06 707/999.009 |
| 2007/0014407 A1 * | 1/2007 | Narendra | H04L 9/0822 380/259 |
| 2007/0016798 A1 * | 1/2007 | Narendra | H04L 9/0866 713/189 |
| 2007/0033642 A1 | 2/2007 | Ganesan et al. | |
| 2007/0087756 A1 | 4/2007 | Hoffberg | |
| 2007/0112676 A1 | 5/2007 | Kontio et al. | |
| 2007/0186105 A1 | 8/2007 | Bailey et al. | |
| 2007/0239991 A1 * | 10/2007 | Cheng | H04W 12/06 713/186 |
| 2007/0258585 A1 | 11/2007 | Sandhu et al. | |
| 2007/0294746 A1 * | 12/2007 | Sasakura | B60R 25/2018 726/17 |
| 2008/0010449 A1 | 1/2008 | Holtzman et al. | |
| 2008/0010450 A1 | 1/2008 | Holtzman et al. | |
| 2008/0010451 A1 | 1/2008 | Holtzman et al. | |
| 2008/0010452 A1 | 1/2008 | Holtzman et al. | |
| 2008/0010455 A1 | 1/2008 | Holtzman et al. | |
| 2008/0010458 A1 | 1/2008 | Holtzman et al. | |
| 2008/0028230 A1 * | 1/2008 | Shatford | H04L 9/3231 713/186 |
| 2008/0034440 A1 | 1/2008 | Holtzman et al. | |

(56) References Cited

U.S. PATENT DOCUMENTS

| | | | |
|---|---|---|---|
| 2008/0040276 A1* | 2/2008 | Hammad | G06Q 20/3674 705/44 |
| 2008/0077791 A1 | 3/2008 | Lund et al. | |
| 2008/0077796 A1 | 3/2008 | Lund et al. | |
| 2008/0098464 A1* | 4/2008 | Mizrah | G06F 21/36 726/5 |
| 2008/0244272 A1* | 10/2008 | Hsieh | H04L 9/3231 713/184 |
| 2008/0256616 A1* | 10/2008 | Guarraci | H04L 9/3242 726/5 |
| 2008/0301461 A1 | 12/2008 | Coulier et al. | |
| 2009/0019505 A1 | 1/2009 | Gopalakrishnan et al. | |
| 2009/0025080 A1 | 1/2009 | Lund et al. | |
| 2009/0028337 A1 | 1/2009 | Balabine | |
| 2009/0031133 A1* | 1/2009 | Bar-El | H04L 9/3231 713/176 |
| 2009/0055910 A1* | 2/2009 | Lee | H04L 9/3271 726/6 |
| 2009/0077371 A1* | 3/2009 | Powell | H04L 9/083 380/278 |
| 2009/0106556 A1 | 4/2009 | Hamid | |
| 2009/0164797 A1* | 6/2009 | Kramer | G06F 21/32 713/186 |
| 2009/0183008 A1* | 7/2009 | Jobmann | G06F 21/34 235/382 |
| 2009/0204778 A1* | 8/2009 | Marking | H04N 7/1675 711/E12.091 |
| 2009/0210696 A1 | 8/2009 | Moreau | |
| 2009/0228703 A1 | 9/2009 | Grajek et al. | |
| 2009/0235339 A1 | 9/2009 | Mennes et al. | |
| 2009/0240936 A1 | 9/2009 | Lambiase et al. | |
| 2009/0282467 A1* | 11/2009 | Schenk | H04W 12/06 726/9 |
| 2009/0307139 A1* | 12/2009 | Mardikar | H04L 63/0823 726/19 |
| 2009/0307486 A1 | 12/2009 | Grajek et al. | |
| 2009/0316907 A1* | 12/2009 | Cachin | H04L 9/0891 380/278 |
| 2009/0327744 A1* | 12/2009 | Hatano | G06F 21/32 726/19 |
| 2010/0083371 A1* | 4/2010 | Bennetts | H04N 7/163 726/19 |
| 2010/0100724 A1 | 4/2010 | Kaliski, Jr. | |
| 2010/0106973 A1* | 4/2010 | Guenther | H04L 9/3247 713/176 |
| 2010/0138652 A1 | 6/2010 | Sela et al. | |
| 2010/0138914 A1* | 6/2010 | Davis | H04L 9/3231 726/19 |
| 2010/0185860 A1 | 7/2010 | Mishra et al. | |
| 2010/0185864 A1* | 7/2010 | Gerdes, Jr. | H04L 9/3213 713/176 |
| 2010/0217982 A1* | 8/2010 | Brown | H04W 12/069 713/168 |
| 2010/0306533 A1 | 12/2010 | Phatak | |
| 2010/0317420 A1 | 12/2010 | Hoffberg | |
| 2011/0035584 A1 | 2/2011 | Meyerstein et al. | |
| 2011/0072274 A1 | 3/2011 | Leoutsarakos et al. | |
| 2011/0090541 A1* | 4/2011 | Harper | G06V 40/13 715/705 |
| 2011/0095863 A1* | 4/2011 | Laaroussi | H04L 9/3231 726/19 |
| 2011/0113245 A1* | 5/2011 | Varadarajan | G06F 21/34 713/168 |
| 2011/0119155 A1* | 5/2011 | Hammad | G06Q 20/42 235/382 |
| 2011/0126000 A1 | 5/2011 | Pang et al. | |
| 2011/0131661 A1* | 6/2011 | Valls Fontanals | G06F 21/645 726/26 |
| 2011/0159848 A1* | 6/2011 | Pei | G06F 21/42 455/411 |
| 2011/0161672 A1 | 6/2011 | Martinez et al. | |
| 2011/0163845 A1* | 7/2011 | Wong | G07C 9/257 340/5.83 |
| 2011/0209208 A1* | 8/2011 | Quach | H04L 63/0853 726/7 |
| 2011/0258452 A1 | 10/2011 | Coulier et al. | |
| 2011/0276495 A1 | 11/2011 | Varadarajan et al. | |
| 2011/0289576 A1* | 11/2011 | Cheng | G09C 1/00 726/9 |
| 2011/0302646 A1 | 12/2011 | Ronda et al. | |
| 2012/0018506 A1* | 1/2012 | Hammad | G06Q 20/385 235/375 |
| 2012/0030475 A1* | 2/2012 | Ma | H04L 63/08 380/259 |
| 2012/0054842 A1* | 3/2012 | Urios Rodriguez | G06Q 20/40 726/6 |
| 2012/0066501 A1 | 3/2012 | Xiong | |
| 2012/0066504 A1* | 3/2012 | Hird | G06F 21/31 713/183 |
| 2012/0066749 A1* | 3/2012 | Taugbol | G06F 21/35 726/6 |
| 2012/0079569 A1* | 3/2012 | Mendelovich | H04W 12/062 726/5 |
| 2012/0110342 A1* | 5/2012 | Agrawal | H04L 63/0478 713/189 |
| 2012/0124370 A1* | 5/2012 | Choi | H04W 12/04 713/159 |
| 2012/0131350 A1* | 5/2012 | Atherton | H04L 63/061 713/186 |
| 2012/0144461 A1* | 6/2012 | Rathbun | G06Q 20/4014 726/5 |
| 2012/0155636 A1* | 6/2012 | Muthaiah | H04L 9/0825 380/44 |
| 2012/0159153 A1 | 6/2012 | Shim et al. | |
| 2012/0159163 A1* | 6/2012 | von Behren | G06Q 20/3823 713/168 |
| 2012/0159195 A1* | 6/2012 | von Behren | G06F 21/62 713/193 |
| 2012/0170743 A1 | 7/2012 | Senese et al. | |
| 2012/0203663 A1 | 8/2012 | Sinclair et al. | |
| 2012/0204033 A1* | 8/2012 | Etchegoyen | H04L 9/3231 713/175 |
| 2012/0208557 A1* | 8/2012 | Carter | G01S 19/23 455/456.1 |
| 2012/0268248 A1* | 10/2012 | Hiraide | H04L 63/0861 340/5.83 |
| 2012/0297206 A1 | 11/2012 | Nord et al. | |
| 2012/0311322 A1* | 12/2012 | Koyun | G06Q 20/3829 713/155 |
| 2012/0324242 A1 | 12/2012 | Kirsch | |
| 2013/0046972 A1 | 2/2013 | Campagna et al. | |
| 2013/0054433 A1* | 2/2013 | Giard | H04L 63/08 709/224 |
| 2013/0066772 A1 | 3/2013 | Xiong | |
| 2013/0067545 A1* | 3/2013 | Hanes | H04L 9/3231 726/6 |
| 2013/0091564 A1 | 4/2013 | Fitzgerald et al. | |
| 2013/0124855 A1* | 5/2013 | Varadarajan | G07F 19/20 726/4 |
| 2013/0139222 A1* | 5/2013 | Kirillin | H04L 67/02 726/4 |
| 2013/0159195 A1 | 6/2013 | Kirillin et al. | |
| 2013/0179692 A1* | 7/2013 | Tolba | H04L 63/0861 713/179 |
| 2013/0215275 A1* | 8/2013 | Berini | G06V 10/993 348/150 |
| 2013/0242706 A1* | 9/2013 | Newsome, Jr. | G10L 19/018 367/197 |
| 2013/0254036 A1* | 9/2013 | Trinh | H04L 63/0838 705/14.64 |
| 2013/0254117 A1* | 9/2013 | von Mueller | G06Q 20/3829 705/71 |
| 2013/0263211 A1* | 10/2013 | Neuman | G06Q 20/322 726/1 |
| 2013/0263212 A1 | 10/2013 | Faltyn et al. | |
| 2013/0290707 A1 | 10/2013 | Sinclair et al. | |
| 2013/0311784 A1* | 11/2013 | Bleahen | H04L 9/3231 713/185 |

(56) References Cited

U.S. PATENT DOCUMENTS

| | | |
|---|---|---|
| 2013/0318625 A1* | 11/2013 | Fan .................. G06F 21/62 726/27 |
| 2013/0333006 A1 | 12/2013 | Tapling et al. |
| 2013/0333008 A1 | 12/2013 | Tapling et al. |
| 2013/0340054 A1* | 12/2013 | Subramanya ........... G06F 21/33 726/5 |
| 2014/0040611 A1 | 2/2014 | Tenenboym et al. |
| 2014/0064480 A1 | 3/2014 | Hartley et al. |
| 2014/0082715 A1 | 3/2014 | Grajek et al. |
| 2014/0087790 A1* | 3/2014 | Babbage ............... H04W 8/183 455/558 |
| 2014/0101742 A1* | 4/2014 | Wu .......................... G06F 21/36 726/7 |
| 2014/0115696 A1* | 4/2014 | Fadell .................... G06F 21/32 726/19 |
| 2014/0157388 A1* | 6/2014 | Tsumura ............. H04L 63/0478 726/7 |
| 2014/0157391 A1* | 6/2014 | Choi .................... H04W 12/069 726/9 |
| 2014/0164776 A1 | 6/2014 | Hook et al. |
| 2014/0189359 A1 | 7/2014 | Marien et al. |
| 2014/0219448 A1 | 8/2014 | Froels et al. |
| 2014/0223175 A1 | 8/2014 | Bhatnagar |
| 2014/0230039 A1* | 8/2014 | Prakash .................. G06F 21/35 726/9 |
| 2014/0245377 A1 | 8/2014 | Faltyn et al. |
| 2014/0245378 A1 | 8/2014 | Faltyn et al. |
| 2014/0250512 A1* | 9/2014 | Goldstone ........ G06Q 20/40145 726/6 |
| 2014/0281477 A1 | 9/2014 | Nayshtut et al. |
| 2014/0281506 A1* | 9/2014 | Redberg .............. H04L 63/0442 713/159 |
| 2014/0281539 A1 | 9/2014 | Faltyn et al. |
| 2014/0281560 A1* | 9/2014 | Ignatchenko ......... H04L 9/0897 713/181 |
| 2014/0282543 A1* | 9/2014 | Ignatchenko ....... G06F 9/45558 718/1 |
| 2014/0282925 A1* | 9/2014 | Walsh .................. H04L 63/0853 726/5 |
| 2014/0283010 A1 | 9/2014 | Rutkowski et al. |
| 2014/0289118 A1* | 9/2014 | Kassemi ............... G06Q 20/388 705/44 |
| 2014/0289834 A1* | 9/2014 | Lindemann .......... G06Q 20/425 726/7 |
| 2014/0331049 A1 | 11/2014 | Duby et al. |
| 2014/0359308 A1* | 12/2014 | Tsai ........................ G06F 21/85 713/189 |
| 2014/0365780 A1* | 12/2014 | Movassaghi .......... H04L 9/3228 713/184 |
| 2014/0372752 A1 | 12/2014 | Salllis |
| 2015/0006895 A1 | 1/2015 | Irvine |
| 2015/0012339 A1* | 1/2015 | Onischuk ............... G07C 13/00 235/386 |
| 2015/0013000 A1* | 1/2015 | Linnakangas ......... H04L 63/168 726/14 |
| 2015/0039891 A1* | 2/2015 | Ignatchenko ....... H04L 63/0853 718/1 |
| 2015/0046339 A1* | 2/2015 | Wong .................. G06Q 20/4016 705/44 |
| 2015/0073992 A1* | 3/2015 | Weiner ............... G06Q 20/3278 705/44 |
| 2015/0074615 A1* | 3/2015 | Han ........................ G06F 21/41 715/863 |
| 2015/0082399 A1 | 3/2015 | Wu et al. |
| 2015/0095648 A1 | 4/2015 | Nix |
| 2015/0113277 A1 | 4/2015 | Harkins |
| 2015/0117639 A1 | 4/2015 | Feekes |
| 2015/0121511 A1* | 4/2015 | Jin .......................... G07C 9/37 726/19 |
| 2015/0127965 A1* | 5/2015 | Hong .................... H04L 9/3231 713/323 |
| 2015/0143118 A1 | 5/2015 | Sheller et al. |
| 2015/0180865 A1* | 6/2015 | Wong ................... H04L 9/3231 726/4 |
| 2015/0199684 A1* | 7/2015 | Maus ..................... H04L 67/12 705/71 |
| 2015/0213433 A1* | 7/2015 | Khan ................ G06Q 20/3829 705/71 |
| 2015/0237049 A1 | 8/2015 | Grajek et al. |
| 2015/0244706 A1 | 8/2015 | Grajek et al. |
| 2015/0270961 A1* | 9/2015 | Barnett ................ H04L 63/123 713/189 |
| 2015/0317625 A1* | 11/2015 | Hammad ............ G06Q 20/385 705/67 |
| 2015/0318990 A1* | 11/2015 | Berger ..................... H04L 9/30 380/255 |
| 2015/0318998 A1 | 11/2015 | Erlikhman et al. |
| 2015/0319142 A1 | 11/2015 | Herberg et al. |
| 2015/0319151 A1* | 11/2015 | Chastain ................ H04L 9/083 713/171 |
| 2015/0324563 A1* | 11/2015 | Deutschmann ....... G06F 16/285 726/7 |
| 2015/0326567 A1* | 11/2015 | Hamburg ............... G06F 21/72 713/155 |
| 2015/0333910 A1* | 11/2015 | Kirdahy ................. G06F 21/34 713/186 |
| 2015/0349959 A1* | 12/2015 | Marciniak ............. G06F 21/32 713/186 |
| 2015/0350894 A1 | 12/2015 | Brand |
| 2015/0358316 A1* | 12/2015 | Cronin ................ H04L 63/0861 726/6 |
| 2015/0358317 A1* | 12/2015 | Deutschmann ..... H04W 12/065 713/186 |
| 2015/0373011 A1* | 12/2015 | Subramanya ......... H04L 63/083 726/9 |
| 2016/0005042 A1* | 1/2016 | Tervo ................... G06Q 20/425 705/67 |
| 2016/0006729 A1* | 1/2016 | Yang ................... H04L 63/0428 713/156 |
| 2016/0007195 A1* | 1/2016 | Goldstone ........... H04W 12/068 455/411 |
| 2016/0013947 A1 | 1/2016 | Jaber et al. |
| 2016/0065370 A1 | 3/2016 | Le Saint et al. |
| 2016/0065550 A1* | 3/2016 | Kanov .................. H04L 63/061 726/7 |
| 2016/0086184 A1* | 3/2016 | Carpenter .......... G06Q 20/4016 705/44 |
| 2016/0094540 A1 | 3/2016 | Camenisch et al. |
| 2016/0105540 A1* | 4/2016 | Kwon ................ H04N 21/4312 715/744 |
| 2016/0119780 A1* | 4/2016 | Jung ....................... H04W 8/205 455/419 |
| 2016/0134599 A1 | 5/2016 | Ross et al. |
| 2016/0142205 A1* | 5/2016 | Mohan .................. H04L 9/0872 380/44 |
| 2016/0156598 A1* | 6/2016 | Alonso Cebrian .......................... H04L 63/0861 713/168 |
| 2016/0156607 A1* | 6/2016 | Kim ....................... H04W 4/50 726/7 |
| 2016/0157085 A1* | 6/2016 | Yeoum .................. H04L 67/306 455/435.1 |
| 2016/0171186 A1* | 6/2016 | Marking ................. G06F 21/10 713/189 |
| 2016/0205538 A1* | 7/2016 | Kweon ................. H04L 67/306 455/414.1 |
| 2016/0212129 A1* | 7/2016 | Johnston ................ G06F 21/73 |
| 2016/0241389 A1 | 8/2016 | Le Saint et al. |
| 2016/0241537 A1* | 8/2016 | Cha ......................... H04L 63/20 |
| 2016/0260098 A1* | 9/2016 | Landrock ............... G06F 21/56 |
| 2016/0262073 A1 | 9/2016 | Muley et al. |
| 2016/0285871 A1* | 9/2016 | Chathoth ............ H04L 63/0807 |
| 2016/0323086 A1* | 11/2016 | Sun ..................... H04W 12/086 |
| 2016/0330199 A1 | 11/2016 | Weiner ................ H04L 63/0853 |
| 2016/0337131 A1* | 11/2016 | de Andrada ............. H04L 9/14 |
| 2016/0337329 A1 | 11/2016 | Sood et al. |
| 2016/0366105 A1 | 12/2016 | Smith et al. |
| 2016/0371683 A1* | 12/2016 | Maus .................. G06Q 20/3226 |
| 2017/0012945 A1 | 1/2017 | Poffenbarger |

(56) References Cited

U.S. PATENT DOCUMENTS

| | | | |
|---|---|---|---|
| 2017/0018207 A1 | 1/2017 | Rodriguez | |
| 2017/0019254 A1* | 1/2017 | Bone | H04L 9/0894 |
| 2017/0026180 A1 | 1/2017 | Salllis | |
| 2017/0026385 A1* | 1/2017 | Zarkesh | H04W 4/80 |
| 2017/0033931 A1 | 2/2017 | Fries et al. | |
| 2017/0034133 A1 | 2/2017 | Korondi et al. | |
| 2017/0041309 A1* | 2/2017 | Ekambaram | H04L 63/1483 |
| 2017/0060259 A1* | 3/2017 | Yang | G06F 3/0227 |
| 2017/0061147 A1* | 3/2017 | Dash | H04L 63/0876 |
| 2017/0070353 A1 | 3/2017 | Suwirya et al. | |
| 2017/0078278 A1* | 3/2017 | Hong | H04W 12/068 |
| 2017/0099140 A1 | 4/2017 | Hoy et al. | |
| 2017/0099603 A1* | 4/2017 | Vicente Ruggiero | H04L 9/0863 |
| 2017/0104739 A1* | 4/2017 | Lansler | G06F 21/602 |
| 2017/0109751 A1 | 4/2017 | Dunkelberger et al. | |
| 2017/0111170 A1 | 4/2017 | Baghdasaryan | |
| 2017/0148009 A1* | 5/2017 | Perez Lafuente | H04L 63/20 |
| 2017/0170955 A1* | 6/2017 | Wood | H04L 9/3247 |
| 2017/0230363 A1* | 8/2017 | Deutschmann | H04W 12/065 |
| 2017/0244692 A1* | 8/2017 | Bhupathiraju | H04L 63/083 |
| 2017/0244730 A1* | 8/2017 | Sancheti | H04L 63/205 |
| 2017/0264596 A1* | 9/2017 | Maydanik | H04L 9/0656 |
| 2017/0270517 A1* | 9/2017 | Vasu | G06Q 20/4018 |
| 2017/0324729 A1* | 11/2017 | Hon | H04L 63/083 |
| 2017/0364875 A1* | 12/2017 | Efroni | G06F 21/31 |
| 2017/0364911 A1* | 12/2017 | Landrok | G06Q 20/385 |
| 2018/0075536 A1* | 3/2018 | Jayaram | G06Q 20/26 |
| 2018/0091552 A1 | 3/2018 | Hsiung et al. | |
| 2018/0121921 A1* | 5/2018 | Woo | H04W 12/06 |
| 2018/0152296 A1* | 5/2018 | Parez | H04L 9/30 |
| 2018/0205743 A1 | 7/2018 | Mciver et al. | |
| 2018/0206117 A1 | 7/2018 | Stahl | |
| 2018/0254909 A1* | 9/2018 | Hancock | H04L 9/3268 |
| 2018/0270067 A1* | 9/2018 | Woo | H04L 9/32 |
| 2018/0337907 A1* | 11/2018 | Bhansali | H04L 63/08 |
| 2018/0350180 A1* | 12/2018 | Onischuk | G07C 13/00 |
| 2018/0357638 A1* | 12/2018 | Wang | H04L 9/3247 |
| 2018/0359096 A1* | 12/2018 | Ford | H04L 9/3247 |
| 2019/0007400 A1* | 1/2019 | Navarro Luft | H04L 63/0861 |
| 2019/0036940 A1* | 1/2019 | Balakrishnan | H04L 63/12 |
| 2019/0050855 A1* | 2/2019 | Martino | G06F 16/182 |
| 2019/0065406 A1 | 2/2019 | Steiner et al. | |
| 2019/0188707 A1* | 6/2019 | Arora | G06Q 20/3224 |
| 2019/0200218 A1* | 6/2019 | Redberg | H04L 9/12 |
| 2019/0213585 A1* | 7/2019 | Patni | H04L 63/0838 |
| 2019/0222576 A1* | 7/2019 | Borkar | H04L 63/0884 |
| 2019/0289017 A1* | 9/2019 | Agarwal | H04L 9/0643 |
| 2019/0296913 A1* | 9/2019 | Verma | H04L 63/0838 |
| 2019/0305953 A1 | 10/2019 | Le Saint et al. | |
| 2019/0305955 A1* | 10/2019 | Verma | H04L 9/3247 |
| 2019/0306153 A1* | 10/2019 | Girdhar | G06F 21/45 |
| 2019/0312861 A1* | 10/2019 | Kairi | G06F 21/36 |
| 2019/0327223 A1* | 10/2019 | Kumar | H04L 63/0853 |
| 2019/0347888 A1* | 11/2019 | Agbeyo | G07D 7/0043 |
| 2019/0384931 A1* | 12/2019 | Lahav | G06F 21/64 |
| 2019/0394053 A1* | 12/2019 | Yu | G06F 21/33 |
| 2020/0045038 A1* | 2/2020 | Mumma | G06F 21/41 |
| 2020/0059468 A1* | 2/2020 | Wolosewicz | G10L 15/22 |
| 2020/0092113 A1 | 3/2020 | Hutchison et al. | |
| 2020/0092330 A1 | 3/2020 | Hayton | |
| 2020/0106771 A1* | 4/2020 | Guibert | H04L 9/3247 |
| 2020/0137052 A1* | 4/2020 | Sunkavally | H04L 63/0838 |
| 2020/0154272 A1* | 5/2020 | Uy | H04W 12/08 |
| 2020/0162454 A1* | 5/2020 | Jain | H04L 63/0815 |
| 2020/0226601 A1* | 7/2020 | Gurunathan | G06Q 20/4014 |
| 2020/0242227 A1* | 7/2020 | Bowness | G06F 21/34 |
| 2020/0252392 A1* | 8/2020 | Mullins | H04L 63/0838 |
| 2020/0387887 A1* | 12/2020 | Rathod | G06Q 20/3224 |
| 2021/0004786 A1* | 1/2021 | Mossler | H04L 9/3073 |
| 2021/0012073 A1 | 1/2021 | Suko et al. | |
| 2021/0026544 A1* | 1/2021 | Tav | G06F 12/0891 |
| 2021/0065165 A1* | 3/2021 | Wadhwa | G06Q 20/027 |
| 2021/0073367 A1* | 3/2021 | Kim | B60R 25/252 |
| 2021/0078571 A1* | 3/2021 | Zhu | H04W 12/03 |
| 2021/0158360 A1* | 5/2021 | Somani | H04L 63/0838 |
| 2021/0176059 A1* | 6/2021 | Hertrich | H04L 9/3271 |
| 2021/0176063 A1 | 6/2021 | Liu et al. | |
| 2021/0182847 A1* | 6/2021 | Lian | H04L 9/0618 |
| 2021/0184858 A1 | 6/2021 | Perry | |
| 2021/0185575 A1* | 6/2021 | Marcelli | H04W 48/18 |
| 2021/0211876 A1* | 7/2021 | Bakshi | H04W 12/033 |
| 2021/0248600 A1* | 8/2021 | Garg | G06Q 20/20 |
| 2021/0320794 A1* | 10/2021 | Auh | H04L 9/0861 |
| 2021/0342816 A1* | 11/2021 | Benkreira | G06Q 20/405 |
| 2022/0078184 A1* | 3/2022 | Traynor | H04W 12/069 |
| 2022/0114245 A1* | 4/2022 | Krishan | G06F 21/32 |
| 2022/0116385 A1* | 4/2022 | Hertrich | H04L 9/3213 |
| 2022/0116392 A1* | 4/2022 | Shah | H04L 63/0876 |
| 2022/0139511 A1* | 5/2022 | Osborn | H04L 9/321 705/2 |
| 2022/0217135 A1* | 7/2022 | Jarvis | H04L 63/0853 |
| 2022/0237608 A1* | 7/2022 | Rule | G06Q 20/3278 |
| 2022/0255945 A1* | 8/2022 | Guan | H04L 63/102 |
| 2022/0327525 A1* | 10/2022 | Tsitrin | H04L 9/0897 |
| 2022/0335432 A1* | 10/2022 | Rule | G06Q 20/12 |
| 2022/0345309 A1* | 10/2022 | Rule | H04L 9/3234 |
| 2022/0353081 A1* | 11/2022 | Duvdevani | G06F 16/955 |
| 2022/0385654 A1 | 12/2022 | Kim et al. | |
| 2022/0386118 A1 | 12/2022 | Kim et al. | |
| 2022/0386123 A1* | 12/2022 | Sangai | H04W 12/068 |
| 2023/0017314 A1* | 1/2023 | Da Rocha | G06F 21/31 |
| 2023/0020843 A1* | 1/2023 | Bowers | G06F 21/32 |
| 2023/0032549 A1* | 2/2023 | Ciarniello | G06F 21/31 |
| 2023/0033192 A1* | 2/2023 | Sutherland | G06F 21/602 |
| 2023/0065163 A1* | 3/2023 | Vargas | G06Q 20/127 |
| 2023/0083633 A1* | 3/2023 | Desai | H04L 9/3263 726/19 |
| 2023/0096239 A1* | 3/2023 | Cole | G16H 40/40 717/168 |
| 2023/0096899 A1* | 3/2023 | Smith-Rose | H04L 63/1416 726/4 |
| 2023/0115793 A1* | 4/2023 | Jangam | A61B 5/0024 600/365 |
| 2023/0128193 A1* | 4/2023 | Williams | A61B 5/6832 715/711 |
| 2023/0179592 A1* | 6/2023 | Colesanto | H04L 63/107 726/7 |
| 2023/0370448 A1* | 11/2023 | Jhou | H04L 63/083 |
| 2023/0418923 A1* | 12/2023 | Ogbennah | H04W 4/14 |
| 2023/0421368 A1* | 12/2023 | Patil | H04L 9/321 |
| 2024/0031360 A1* | 1/2024 | Wu | H04L 63/0838 |
| 2024/0040348 A1* | 2/2024 | Hua | G16H 40/63 |
| 2024/0048992 A1* | 2/2024 | Way | H04L 63/0838 |
| 2024/0080315 A1* | 3/2024 | Ravuna | H04L 63/0838 |
| 2024/0119132 A1* | 4/2024 | Wieker | G06Q 20/341 |
| 2024/0127237 A1* | 4/2024 | Alkarboly | G06Q 20/3823 |
| 2024/0127942 A1* | 4/2024 | Keller | G16H 10/60 |
| 2024/0171570 A1* | 5/2024 | Rule | H04W 12/06 |
| 2024/0187236 A1* | 6/2024 | Rule | H04L 9/3213 |
| 2024/0195631 A1* | 6/2024 | Yee | H04L 9/3213 |

OTHER PUBLICATIONS

Sen et al "Putting Pressure on Mobile Authentication," 2014 Seventh International Conference on Mobile Computing and Ubiquitous Networking (ICMU), pp. 56-61 (Year: 2014).*

Lu et al "The Design and Implementation of XMPP-based SMS Gateway," 2012 Fourth International Conference on Computational Intelligence, Communication Systems and Networks, IEEE Computer Society, pp. 145-148, (Year: 2012).*

Eldefrawy et al "OTP-Based Two Factor Authentication Using Mobile Phones," 2011 Eighth International Conference on Information Technology: New Generation, IEEE Computer Society, pp. 327-331 (Year: 2011).*

Kogan et al "A Practical Revocation Scheme for Broadcast Encryption Using Smart Cards," IEEE Computer Society, pp. 1-11 ( Year: 2003).*

Neumann et al "A Usable Android Application Implementing Distributed Cryptography for Election Authorities," IEEE, pp. 207-216 (Year: 2014).*

(56) References Cited

OTHER PUBLICATIONS

Wang, et al "Secure Authentication and Authorization Scheme for Mobile Devices," Proceedings of ICCTA2009, pp. 207-211, ( Year: 2009).

Mandal, et al "Multi-Party Key-Exchange with Perfect Forward Secrecy," 2014 International Conference on Information Technology, IEEE Computer Society, pp. 362-367 (Year: 2014).

Yang, et al "An Efficient Mutual Authentication with Key Agreement Protocol for Mobile Devices," 2011 Seventh International Conference on Intelligent Information Hiding and Multimedia Signal Processing, IEEE Computer Society, pp. 145-148 (Year: 2011).

Sax, et al "Sax," "Wireless Technology Infrastructures for Authentication of Patients: PKI that Rings," Journal of the American Medical Informatics Association, vol. 12, No. 3, May-Jun. 2005, pp. 263-268 (Year: 2005).

Gurav, et al "Remote Client Authentication Using Mobile Phone Generated OTP," International Journal of Scientific and Research Publications, vol. 2, Issue 5, May 2012, pp. 1-4 (Year: 2012).

Huang, et al "A new One-Time Password Method," 2013 International Conference on Electronic Engineering and Computer Science, pp. 32-37, Science Direct, (Year: 2013).

Eldefrawy-OTP Based Two Factor Authentication Using Mobile Phones, 2011 Eighth International Conference on Information Technology: New Generations, pp. 327-331 (Year: 2011).

Vaze ("Vaze," "Digital Signature On-Line, One Time Private Key [OTPK]," Online Certification Process with Strong (2-Factor Authentication), International Journal of Scientific & Engineering Research vol. 3, Issue 3, Mar. 2012, pp. 1-5).

\* cited by examiner

SYSTEMS AND METHODS FOR ENHANCED MOBILE DEVICE AUTHENTICATION

RELATED APPLICATIONS

The present application is a continuation application of U.S. patent application Ser. No. 16/994,205, filed Aug. 14, 2020, now U.S. Pat. No. 11,838,421, which is a continuation of U.S. patent application Ser. No. 15/393,836, filed Dec. 29, 2016, now U.S. Pat. No. 10,778,435, which claims the benefit of U.S. Provisional Patent Application Ser. No. 62/273,003, filed Dec. 30, 2015, and U.S. Provisional Patent Application Ser. No. 62/321,060, filed Apr. 11, 2016, the disclosures of each of which is hereby incorporated by reference in its entirety.

BACKGROUND OF THE INVENTION

Banks seek to authenticate customers more effectively and with the best customer possible experience. The mobile device offers huge potential in that it is personal, near ubiquitous, usually with the owner, and increasingly used for banking activity.

SUMMARY OF THE INVENTION

Systems and methods for enhanced mobile authentication are disclosed. In one embodiment, method for electronic device authentication may include (1) a server comprising at least one computer processor communicating a one-time passcode to an electronic device over a first communication channel; (2) the server receiving, from the electronic device over a second communication channel the one-time passcode encrypted with a private key associated with the electronic device; (3) the server decrypting the one-time passcode using a public key; (4) the server validating the one-time passcode; (5) the server generating a device identifier for the electronic device; and (6) the server persisting an association between the device identifier and the electronic device.

In one embodiment, the method may further include the server receiving, from the electronic device over the second communication channel, a password; and the server persisting the password.

In one embodiment, the device identifier may include a universally unique identifier.

In one embodiment, the method may further include the server receiving from the electronic device over the second communication channel, a public key paired with the private key.

In one embodiment, the method may further include the server receiving, from the electronic device over the second communication channel, an application specific verification key; and the server decrypting the application specific verification key. The step of persisting the association between the device identifier and the electronic device further comprises storing an indication that the application specific verification key was valid.

In one embodiment, the application specific verification key may be calculated according to the following equation:

$$ASVK=HASH(salt+Env+OTP);$$

where:
"salt" comprises a cryptographic salt;
"Env" comprises at least one environmental parameter;
OTP is the one-time password; and
HASH comprises a hashing algorithm.

In one embodiment, the method may further include the server receiving, from the electronic device over the second communication channel, device fingerprint data for the electronic device.

In one embodiment, the method may further include the server communicating, over the second communication channel, the device identifier to the electronic device.

According to another embodiment, a method for electronic device authentication may include (1) an application executed by an electronic device comprising at least one computer processor receiving, over a first communication channel, a one-time passcode from a server; (2) the application encrypting the one-time passcode with a private key; (3) the application communicating, over a second communication channel, the one-time passcode encrypted with the private key to the server; (4) the application receiving, from the server, a device identifier for the electronic device; and (5) the application persisting the device identifier.

In one embodiment, the method may further include the application generating an application specific verification key; and the application communicating, over the second communication channel, the application specific verification key to the server; wherein the application specific verification key may be calculated according to the following equation:

$$ASVK=HASH(salt+Env+OTP);$$

where:
"salt" comprises a cryptographic salt;
"Env" comprises at least one environmental parameter;
OTP is the one-time password; and
HASH comprises a hashing algorithm.

In one embodiment, the device identifier may include a universally unique identifier.

In one embodiment, the method may further include the application generating a public key and private key pair; and the application persisting the private key in one of a secure element of the electronic device or in a secure storage element of one of the application and an operating system executed by the electronic device.

In one embodiment, the method may further include the application communicating, over the second communication channel, device fingerprint data for the electronic device to the server.

A system for electronic device authentication may include an electronic device comprising at least one electronic device computer processor, a memory, and an interface; an authentication server comprising at least one server computer processor; a first communication channel between the electronic device and the server; and a second communication channel between the electronic device and the server. The authentication server may generate a one-time passcode and communicates the one-time passcode to the over the first communication channel. The application may encrypt the one-time passcode with a private key and communicates, over the second communication channel, the one-time passcode encrypted with the private key to the authentication server. The authentication server may decrypt the one-time passcode using a public key, and may validate the one-time passcode. It may also generate a device identifier for the electronic device and persist an association between the device identifier and the electronic device. It may then communicate, over the second communication channel, the device identifier for the electronic device to the application. The application may then persist the device identifier.

In one embodiment, the application may generate an application specific verification key, and communicates the application specific verification key to the authentication server over the second communication channel; wherein the application specific verification key may be calculated according to the following equation:

$$ASVK=HASH(salt+Env+OTP);$$

where:
"salt" comprises a cryptographic salt;
"Env" comprises at least one environmental parameter;
OTP is the one-time password; and
HASH comprises a hashing algorithm.

In one embodiment, the authentication server may decrypt the application specific verification key and stores an indication that the application specific verification key was valid.

In one embodiment, the authentication server may receive, from the electronic device over the second communication channel, a password, and may persist the password.

In one embodiment, the device identifier may be a universally unique identifier.

In one embodiment, the authentication server may receive, from the application, an identification of the first communication channel for receiving the one-time passcode.

In one embodiment, the authentication server may receive from the electronic device over the second communication channel, device fingerprint data for the electronic device.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
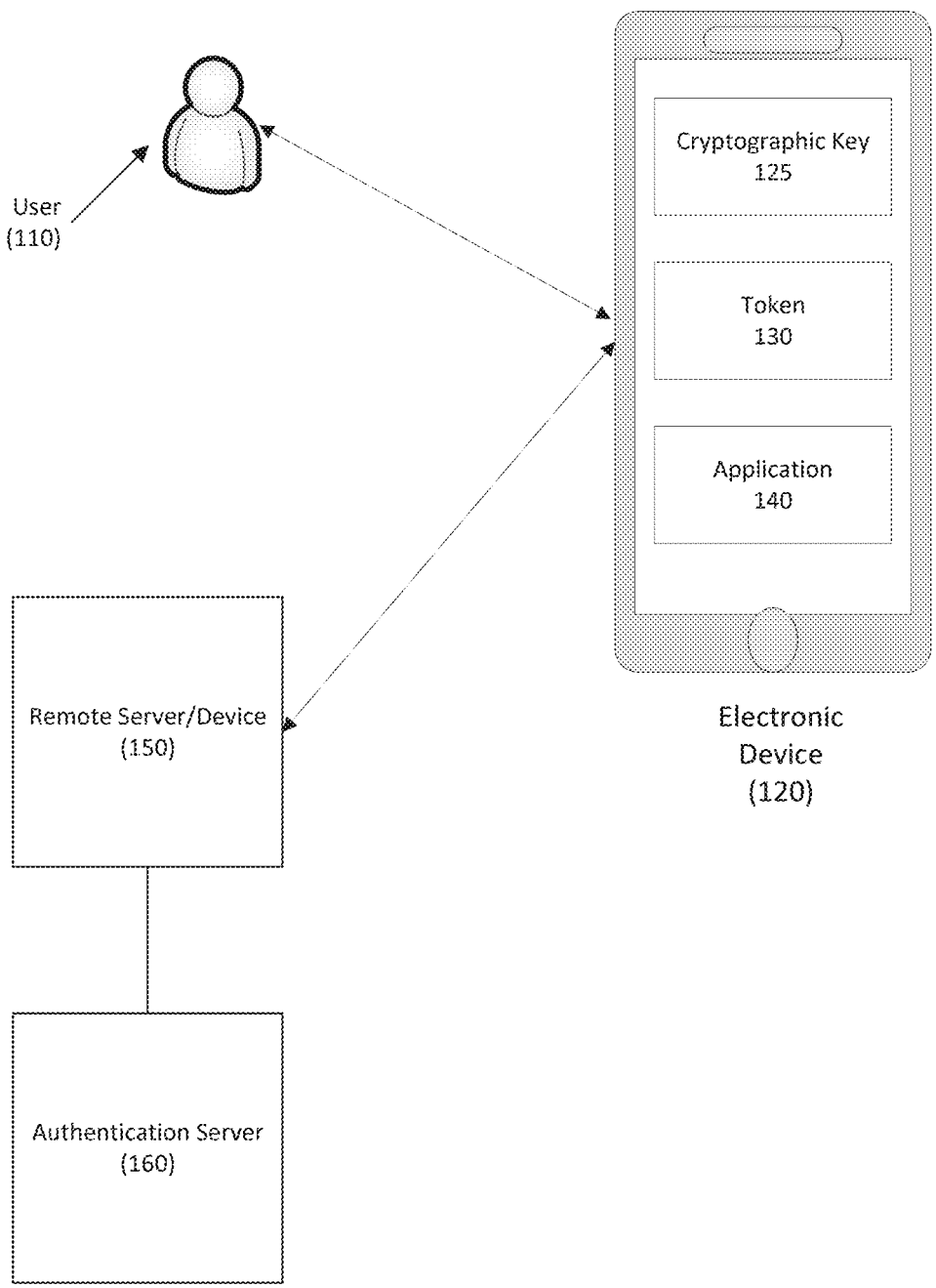
FIG. 1 depicts a system for enhanced mobile device authentication according to one embodiment.

Several embodiments of the present invention and their advantages may be understood by referring to FIGS. 1-5.

Embodiments of the present disclosure relate to enhancing the security of electronic devices, and, in particular, mobile electronic devices. Embodiments disclosed herein may provide for three levels of "trust": (1) trust that the device is secure; (2) trust that the communication channel between the device and an application executed by the device is secure; and (3) trust that the user operating the device is the individual that is associated with the device. To achieve these levels of trust, (1) the inherent security of the device may be tested, (2) the ownership of the device may be established through enrollment controls, (3) cryptographic keys and/or tokens that are a unique function of the application, the device, and the user identity may be deployed. The unique binding among the application, the device, and the user identity may be exploited to strengthen and simplify the authentication from the device. Moreover, a token encrypted with a unique cryptographic key may be used to pass to other channels and may act as a strong identifier.

In one embodiment, the token may be encrypted using a cryptographic key to act as a proxy for the customer's identity. For example, the encrypted token may support a number of different customer experiences or use cases, such as being able to use the mobile device to authenticate the customer to, for example, an ATM.

As another example, a token may be provided to the customer when the customer uses an application on the mobile device to authenticate a customer to a customer service representative. In one embodiment, customer data (e.g., account information, potential reasons for contacting the customer service representative, etc.) may be associated with the token and may be provided to the customer service representative.

The disclosure of U.S. patent application Ser. No. 13/644, 326 is hereby incorporated by reference in its entirety.

In addition, a one-time Application Source Validation Key, or ASVK, may be used to verify that the application, program, or other software, is from a trusted source. For example, because mobile applications may leverage standard HTTPs internet connectivity to communicate secure requests to the server, even with mutual authentication, it cannot be definitively determined whether the application or software is authentic or otherwise sanctioned. Thus, it may be difficult to distinguish the application or software from impostor apps or scripts running on a server.

In one embodiment, a cryptographic key and/or a token may be deployed to an electronic device (e.g., a mobile electronic device, an Internet of Things appliance, a desktop computer, a workstation, etc.) during a registration process for the application, program, or software. In one embodiment, signed, sanctioned applications or software may be distributed with a protected cryptographic functionality to support application source verification. The cryptographic function, which may be protected by application-level white box cryptography, may be called to encrypt a one-time passcode (OTP) known environmental parameters and generate a one-time challenge/response. For example, in one embodiment, an ASVK encrypted cipher may be calculated as follows:

$$ASVK=HASH(salt+Env+OTP)$$

Where: (1) "Salt" may be a sequence of bits, known as a cryptographic salt and may have a static x-bit long value; "Env" may be a set of known environmental parameters or attributes, such as device fingerprint data, etc., and OTP may be a one-time ephemeral passcode delivered by the server as part of the registration process. In one embodiment, Salt, Env and OTP may be run through an ADD function, and a hashing algorithm (e.g. SHA256, SHA512, etc.) may be run over that to generate ASVK.

Other calculations for determining ASVK may be used as is necessary and/or desired.

In one embodiment, the static data may include an algorithm that may be shared by both the server and the electronic device. In one embodiment, only a sanctioned application, program, or software, properly provisioned with the protected cryptographic functionality, may create a valid ASVK. The ASVK may be used to verify that the source of mobile web service APIs is genuinely a sanctioned native application.

In another embodiment, a mobile electronic device may be used to continuously authenticate the user. At the manufacturer's device level, a variety of user data can be collected to create an association between the electronic device and its regular authorized user. As reliance on electronic devices to identify users grows, a set of controls may be used mitigate fraudulent usage.

In one embodiment, servers and virtual machines deployed within the enterprise, private and public cloud infrastructure may be used for continuous authentication.

In one embodiment, devices may leverage sensors, monitors, etc. to establish probabilistic behavior patterns. This may include, for example, biometric data, user movement data, user geolocation data, etc. In combination with machine learning, these patterns may be associated with the notion of a "regular," or registered, authorized device user.

Applications that may be deployed to the devices may associate an application level identity token with the device's "regular" authorized user. Subsequent application authentication requests will leverage this relationship to assert the application identity is the device's "regular" authorized user.

In one embodiment, the exchange of Personally Identifiable Information ("PII") may not be required. Instead, an anonymous token that correlates back to the identity may be shared between the electronic device and the authentication server.

In one embodiment, if an irregular behavior, or pattern of behaviors, are sensed, the authentication may be terminated.

Referring to FIG. 1, a system for enhanced mobile device authentication according to one embodiment is disclosed. System 100 may include user 110, electronic device 120, remote server/device 150, and authentication server 160. In one embodiment, electronic device 120 may be any suitable electronic device, including workstations, desktop computers, notebook computers, tablet computers, smart phones, Internet of Things (IOT) appliances, etc. In one embodiment, electronic device 120 may provide a secure storage area, such as in a secure element.

Electronic device 120 may execute application 140, which may be any application, computer program, or software. In one embodiment, application 130 may authenticate a user.

In one embodiment, application 140 may provide user 110 with access to sensitive, confidential, or otherwise restricted information and/or resources. In another embodiment, application 140 may provide user 110 with the ability to conduct transactions with sensitive, confidential, or otherwise restricted information and/or resources.

In one embodiment, application 140 may be provided by a financial services provider, such as a financial institution, a payment processor, an investment manager, etc.

In one embodiment, application 140 may be a mobile wallet.

In one embodiment, application 140 and/or the operating system executed by electronic device 120 may include secure storage.

In one embodiment, electronic device 120 may be provided with cryptographic key 125 and token 130. Cryptographic key 125 and/or token 130 may serve to "bind" user 110, application 130, and device 120 to each other. In one embodiment, token 130 that may be encrypted with cryptographic key 125 may be used to authenticate user 110, device 120 and/or application 140 to remote server or device 140.

Any suitable type, format, size, etc. of cryptographic key may be used as is necessary and/or desired.

In one embodiment, cryptographic key 125 may comprise an ASVK.

In one embodiment, remote server/device 150 may be an ATM.

Authentication server 160 may authenticate user 110 and/or electronic device 120. In one embodiment, authentication server 160 may be separate from remote server/device 150. In another embodiment, the functionality of authentication sever 160 may be partially or wholly incorporated into remote server/device 150.

Figure 2:
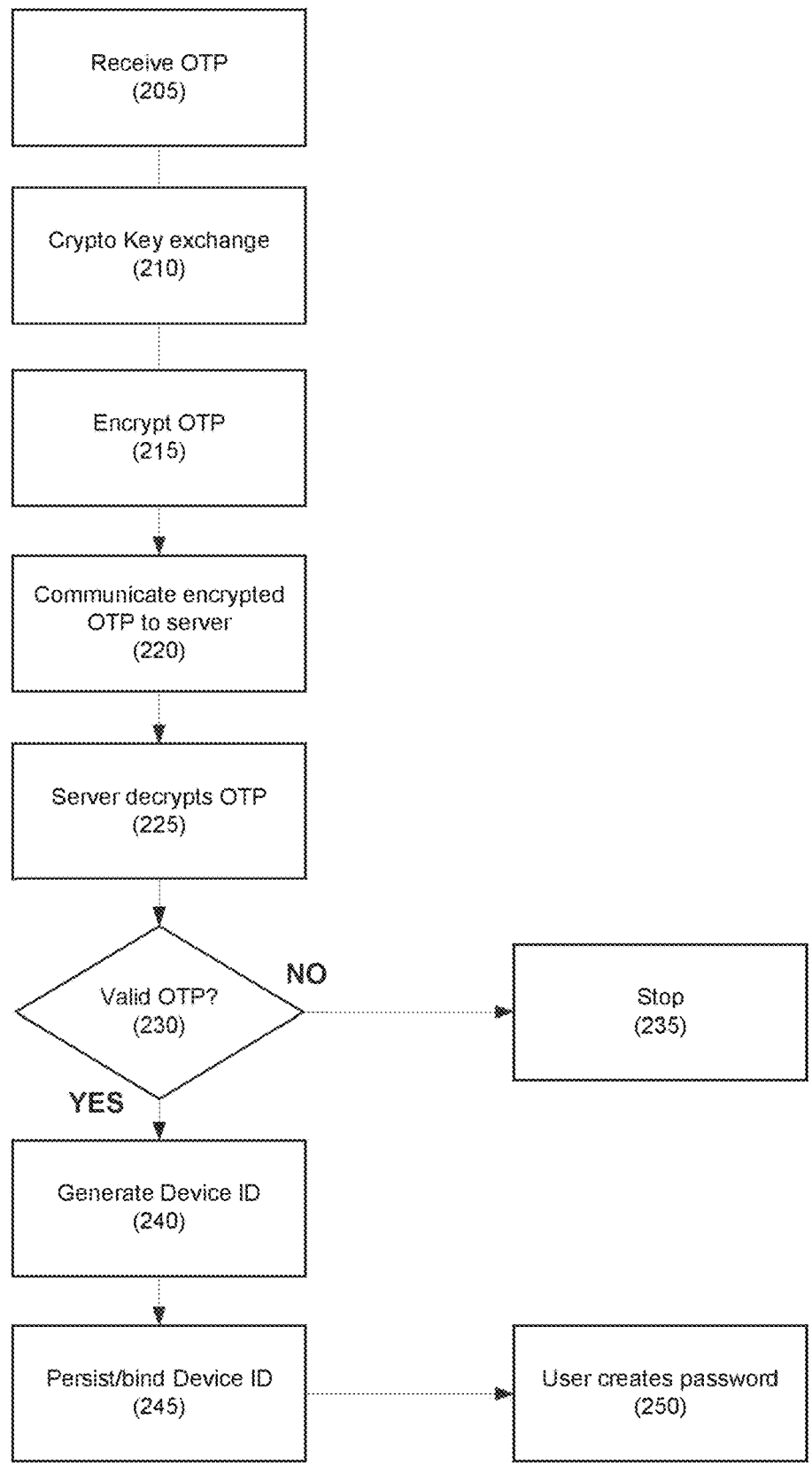
FIG. 2 depicts a method for strong registration according to one embodiment.

Referring to FIG. 2, a method for strong registration is disclosed according to one embodiment.

In step 205, a one-time passcode, or password, may be received by, for example, an application executed by an electronic device. In one embodiment, the one-time passcode may be provided by the server, and may be considered to be a "challenge" in a challenge/response authentication protocol.

In one embodiment, the one-time passcode may be received on an out-of-band network (e.g., SMS, email, etc.).

In step 210, a crypto key exchange may be performed. In one embodiment, the application may generate public and private keys, and may exchange public keys with the authentication server.

In one embodiment, the private key may be persisted in the secure element of the electronic device or in a secure storage element of the application or operating system. In one embodiment, the manner of storage may depend on whether the user may be authenticated to the electronic device using, for example, biometrics. For example, if the electronic device can receive biometrics, and the user is authenticated, the private key may be stored in the electronic device's secure element. If the electronic device is not biometric-enabled, the private key may be stored in the secure storage element of the application or operating system.

In step 215, the one-time passcode may be digitally signed or encrypted using, for example, the private key. The encrypted one-time passcode may be considered to be a "response" in the challenge/response authentication protocol.

In step 220, the encrypted one-time passcode may be communicated to the authentication server. In one embodiment, additional data, such as device fingerprint data, malware data, username, and password, etc. may also be communicated as is necessary and/or desired.

In one embodiment, device fingerprint data may include, for example, operating system data (e.g., operating system version number, etc.), browser data (e.g., browser, version, etc.), locale data (e.g., country, language, etc.), hardware/system data (e.g., operating system, screen resolution, screen aspect ratio, manufacturer, serial number, SIM card, jailbreak information, etc.), settings data, cookie data, mobile application data, etc. It may further collect data from a mobile wallet application, such as user id and password. Other device data may be used as is necessary and/or desired.

In step 225, an authentication server may decrypt the one-time passcode, and, in step 230, the authentication server may determine whether or not the one-time passcode is valid. If it is not, the process may be stopped in step 235. In one embodiment, error messages, warnings, etc. may be provided as is necessary and/or desired.

In step 240, a device identifier may be generated by the authentication server. In one embodiment, the device identifier may be a variant of universally unique identifier (UUID) that may be created based on, for example, the RFC 4122 UUID namespace specification. In one embodiment, the device identifier may be persisted at the authentication server.

In step 245, the device identifier and the electronic device may be may be persisted at, for example, the authentication server. Other information may be persisted as is necessary and/or desired.

In one embodiment, the device identifier may be communicated to the electronic device and persisted at the electronic device.

In step 250, the user may enter a password, and the password may be received and persisted at the authentication server. The user may also provide contact information which may also be persisted in storage at the authentication authority.

Figure 3:
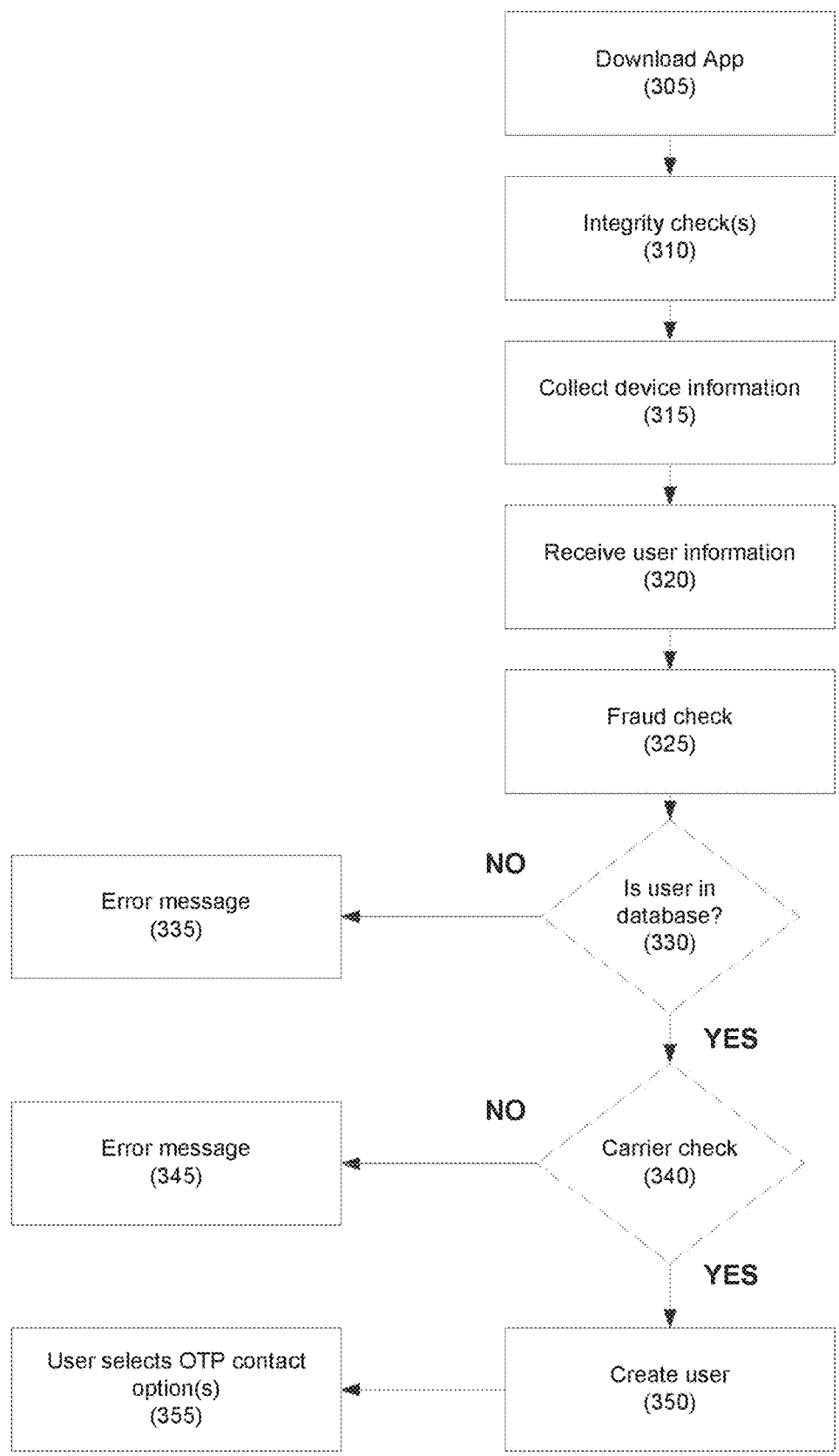
FIG. 3 depicts an enrollment process using enhanced mobile device authentication according to one embodiment.

Referring to FIG. 3, an enrollment process is disclosed according to one embodiment.

In step 305, a user may download a software application or program onto his or her electronic device. In one embodiment, the software application may be downloaded from an app store or similar location.

In step 310, the application may perform an integrity check on the electronic device. In one embodiment, the application may check to see if there is malware on the electronic device, if the electronic device has been "rooted," whether the application is an authorized application, etc. In one embodiment, this may include updating malware detection software.

In one embodiment, any checks that may verify the integrity of the electronic device and/or the operating system executed thereby may be performed as is necessary and/or desired.

In step 315, device profiling data may be collected. In one embodiment, this data may be used to determine whether the electronic device has previously been involved with, or associated with, fraud. In one embodiment, the application may provide electronic device data (e.g., serial number, MAC address, etc.) to an authenticating entity, which may compare the electronic device data to that in a blacklist, a white list, etc.

In step 320, the user may be prompted for user information, such as a user name, account number, date of birth, etc., and may enter such information.

In step 325, the entered data and device profiling data may be provided to the authenticating entity, which may perform a device profiling check for fraud.

In step 330, the authenticating entity may identify the user in its database(s). If the user is not found, a message may be displayed in step 335. In one embodiment, the process may be stopped.

If the user is found, in step 340, an optional carrier check may be performed. For example, if the electronic device is operating on a carrier network, a carrier check may be performed in conjunction with a third party mobile network operator (i.e., a carrier) to corroborate that the user data on record both within, for example, a financial institution as well as the carrier, matches. An unsuccessful carrier check may indicate fraud, and in step 345, a message indicating such may be displayed. In one embodiment, the process may be stopped.

If the carrier check is verified, in step 350, a user may be created, and, in step 355, the user may select one or more one-time passcode contacts (e.g., email, SMS, etc.).

Figure 4:
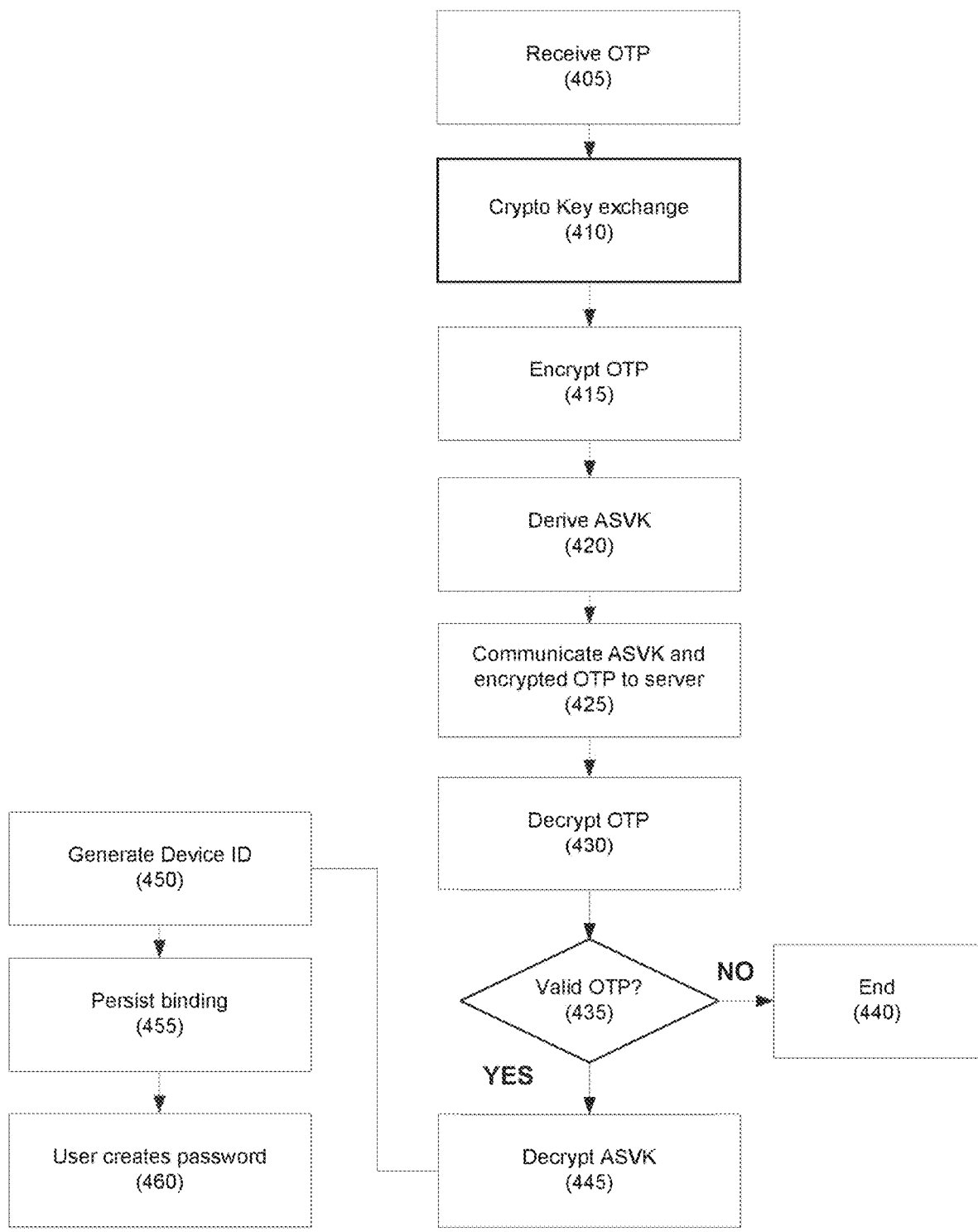
FIG. 4 depicts a method for strong registration using enhanced mobile device authentication according to embodiments.

Referring to FIG. 4, a method for strong registration is disclosed according to one embodiment. In one embodiment, cryptographic key exchange using crypto-authentication protocols may be used among the electronic device, the application executed by the device, and the authentication server.

In step 405, an electronic device may receive a one-time passcode. In one embodiment, the one-time passcode may be received, for example, via an out-of-band communication channel (e.g., SMS, email, etc.). In one embodiment, the out-of-band communication channel may be the one that the user selected during registration.

In step 410, a crypto key exchange may be performed. This may be similar to step 210, above.

In step 415, the one-time passcode may be encrypted using, for example, the private key. This may be similar to step 215, above.

In step 420, the application specific verification key may be derived. In one embodiment, the AVSK may be derived using the algorithm, above. Other suitable algorithms may be used as is necessary and/or desired.

In step 425, the ASVK and the encrypted one-time passcode may be communicated to the authentication server. In one embodiment, additional data, such as device fingerprint data, malware data, username, and password, etc. may also be communicated as is necessary and/or desired. In one embodiment, some or all of the additional data may be encrypted.

In step 430, the authentication server may decrypt the one-time passcode and, in step 435, may determine if the one-time passcode is valid. If it is not, in step 440, the process may end.

If the one-time passcode is valid, in step 445, the AVSK may be decrypted, and in step 450, a device identifier may be generated. This may be similar to step 240, above.

In step 455, the device identifier may be persisted in storage, for example, at the authentication authority. In addition, a Boolean value (e.g., true or false) indicating whether the application source verification process succeeded or failed may also be persisted at the authentication server. Other information may be persisted as is necessary and/or desired.

In one embodiment, the device identifier may be communicated to the electronic device and persisted at the electronic device.

In step 460, the user may then create a password, and may provide contact information. This may be similar to step 250, above.

Figure 5:
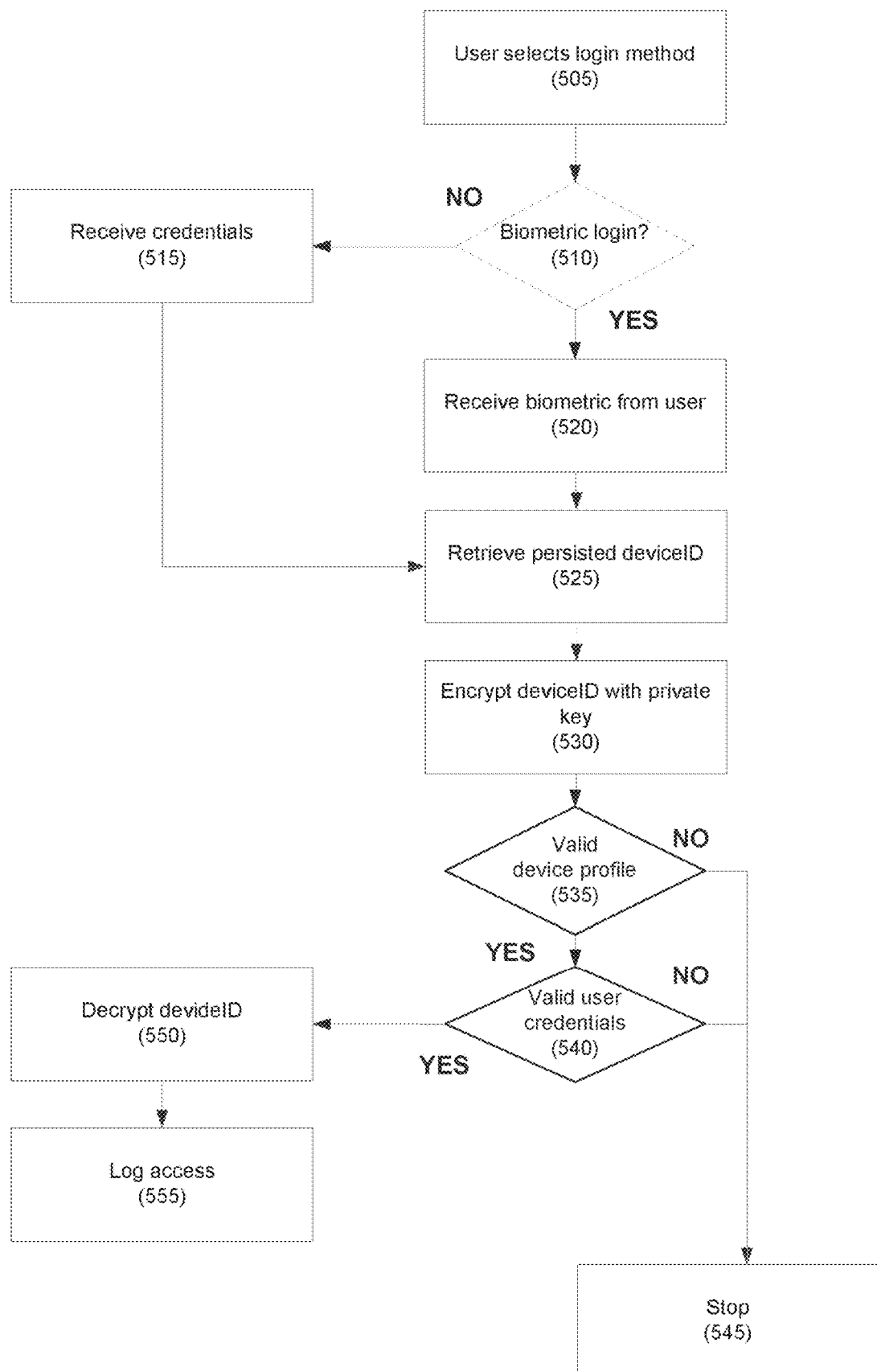
FIG. 5 depicts a method for strong registration using enhanced mobile device authentication according to another embodiment.

Referring to FIG. 5, a method for strong authentication is disclosed according to another embodiment.

In step 505, a user may select a login method, such as userid/password, biometric, etc. If, in step 510, the user does not select a biometric login, the application may receive the user's credentials. If the user selects biometric login, in step 520, the application may receive biometrics from the user.

In step 525, the deviceID may be retrieved from, for example, the device's secure element and, in step 530, the deviceID may be encrypted with, for example, a private key from the device's secure element, or from a secure storage element of the application or operating system.

In one embodiment, as part of this process, a one-time passcode may be received, and an ASVK may be generated and communicated to the authentication server.

In step 535, the electronic device's profile may be verified. If it cannot be verified, in step 555, the process may stop. In one embodiment, this may include checking to see if the electronic device is a familiar electronic device (e.g., a returning electronic device) based on fingerprint data, cookies, etc. In one embodiment a check may be made to determine if the electronic device acting suspiciously (e.g., associated with many accounts, resetting passwords on multiple accounts), known to have been associate with fraud, etc.

In step 540, the user's credentials (e.g., username/password, authentication token, biometrics, etc.) may be checked for validity. If the user's credentials cannot be verified, in step 545, the process may stop.

In step 545, the authentication server may decrypt the deviceID, and, in step 550, access may be granted and logged.

The following disclosures are hereby incorporated, by reference, in their entities: U.S. patent application Ser. Nos. 61/820,917; 61/823,669; 13/908,618; 61/844,097; 13/940,799; 61/860,475; and 13/972,556.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable OSI protocols such as TCP/IP, UDP, IP, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

The invention claimed is:

1. A method for electronic device authentication, comprising:

receiving, at an authentication server and from a computer application executed by an electronic device, a public key, wherein the public key corresponds to a private key as a cryptographic keyset, wherein the cryptographic keyset is generated by the computer application, wherein the cryptographic keyset is generated from input that comprises a unique combination of the computer application, the electronic device, and a user of the electronic device, and wherein the public key is stored by the authentication server for decryption and verification of data encrypted by the computer application using the private key from the cryptographic keyset;

generating, by the authentication server comprising at least one computer processor, a one-time passcode;

communicating, by the authentication server over an out-of-band communication channel, the one-time passcode to the computer application, wherein the out-of-band communication channel is an SMS channel;

receiving, by the authentication server, from the computer application and over an in-band communication channel the one-time passcode encrypted with the private key;

receiving, by the authentication server, from the computer application over the in-band communication channel, an application specific verification key;

receiving, by the authentication server from the computer application over the in-band communication channel, device fingerprint data for the electronic device;

decrypting, by the authentication server, the application specific verification key to verify a source of the computer application;

decrypting, by the authentication server, the encrypted one-time passcode using the public key;

validating, by the authentication server, the one-time passcode;

generating, by the authentication server, a device identifier for the electronic device;

binding, by the authentication server, the device identifier and the electronic device to each other, including storing an indication that the application specific verification key was valid; and communicating, by the authentication server and over the in-band communication channel, the device identifier for the electronic device to the computer application, wherein the computer application stores the device identifier.

2. The method of claim 1, wherein the device identifier comprises a universally unique identifier.

3. The method of claim 1, wherein the one-time passcode is received in a SMS message.

4. The method of claim 1, wherein the application specific verification key is calculated according to the following equation:

ASVK=HASH(salt+Env+OTP);

where:
"salt" comprises a cryptographic salt;
"Env" comprises at least one environmental parameter;
OTP is the one-time passcode; and
HASH comprises a hashing algorithm.

5. A system including at least one computer comprising a processor and a memory, wherein the at least one computer is configured to:

receive at an authentication server and from a computer application executed by an electronic device, a public key, wherein the public key corresponds to a private key as a cryptographic keyset, wherein the cryptographic keyset is generated by the computer application, wherein the cryptographic keyset is generated from input that comprises a unique combination of the computer application, the electronic device, and a user of the electronic device, and wherein the public key is stored by the authentication server for decryption and verification of data encrypted by the computer application using the private key from the cryptographic keyset;

generate by the authentication server comprising at least one processor a one-time passcode;

communicate by the authentication server over an out-of-band communication channel, the one-time passcode to the computer application, wherein the out-of-band communication channel is an SMS channel;

receive by the authentication server from the computer application and over an in-band communication channel the one-time passcode encrypted with the private key;

receive, by the authentication server from the computer application over the in-band communication channel, an application specific verification key;

receive, by the authentication server from the computer application over the in-band communication channel, device fingerprint data for the electronic device;

decrypt, by the authentication server, the application specific verification key to verify a source of the computer application;

decrypt, by the authentication server the encrypted one-time passcode using the public key;

validate, by the authentication server, the one-time passcode;

generate, by the authentication server, a device identifier for the electronic device;

bind, by the authentication server, the device identifier and the electronic device to each other including storing an indication that the application specific verification key was valid; and communicate, by the authentication server, over the in-band communication channel, the device identifier for the electronic device to the computer application, wherein the computer application stores the device identifier.

6. The system of claim 5, wherein the device identifier comprises a universally unique identifier.

7. The system of claim 5, wherein the one-time passcode is received in a SMS message.

8. The system of claim 5, wherein the application specific verification key is calculated according to the following equation:

ASVK=HASH(salt+Env+OTP);

where:
"salt" comprises a cryptographic salt;
"Env" comprises at least one environmental parameter;
OTP is the one-time passcode; and
HASH comprises a hashing algorithm.

9. The system of claim 5, wherein the at least one computer is configured to:

receive, from the computer application, an identification of the out-of-band communication channel for receiving the one-time passcode.

10. A non-transitory computer readable storage medium, including instructions stored thereon, which instructions, when read and executed by one or more computer processors, cause the one or more computer processors to perform steps comprising:

receive at an authentication server and from a computer application executed by an electronic device, a public key, wherein the public key corresponds to a private key as a cryptographic keyset, wherein the cryptographic keyset is generated by the computer application, wherein the cryptographic keyset is generated from input that comprises a unique combination of the computer application, the electronic device, and a user of the electronic device, and wherein the public key is stored by an authentication server for decryption and verification of data encrypted by the computer application using the private key from the cryptographic keyset;

generate, by the authentication server, a one-time passcode;

communicate, by the authentication server, over an out-of-band communication channel, the one-time passcode to the computer application, wherein the out-of-band communication channel is an SMS channel;

receive, by the authentication server, from the computer application and over an in-band communication channel the one-time passcode encrypted with the private key;

receive, by the authentication server and from the computer application over the in-band communication channel, an application specific verification key;

receive, by the authentication server from the computer application over the in-band communication channel, device fingerprint data for the electronic device;

decrypt, by the authentication server, the application specific verification key to verify a source of the computer application;

decrypt, by the authentication server, the encrypted one-time passcode using the public key;

validate, by the authentication server, the one-time passcode;

generate, by the authentication server, a device identifier for the electronic device;

bind, by the authentication server, the device identifier and the electronic device to each other, including storing an indication that the application specific verification key was valid; and communicate, by the authentication server and over the in-band communication channel, the device identifier for the electronic device to the computer application, wherein the computer application stores the device identifier.

11. The non-transitory computer readable storage medium of claim 10, wherein the device identifier comprises a universally unique identifier.

12. The non-transitory computer readable storage medium of claim 10, wherein the one-time passcode is received in a SMS message.

13. The non-transitory computer readable storage medium of claim 10, wherein the application specific verification key is calculated according to the following equation:

$$ASVK=HASH(salt+Env+OTP);$$

where:
"salt" comprises a cryptographic salt;
"Env" comprises at least one environmental parameter;
OTP is the one-time passcode; and
HASH comprises a hashing algorithm.

14. The non-transitory computer readable storage medium of claim 10, comprising:
receiving, from the computer application, an identification of the out-of-band communication channel for receiving the one-time passcode.

* * * * *